United States Patent
Surra

(10) Patent No.: US 10,675,795 B2
(45) Date of Patent: Jun. 9, 2020

(54) METHOD AND APPARATUS FOR THE ON-LINE INTERNAL SILICONING OF BOTTLES FOR PHARMACEUTICAL USE

(71) Applicant: SOFFIERIA BERTOLINI S.P.A., Turin (IT)

(72) Inventor: Renato Surra, Turin (IT)

(73) Assignee: SOFFIERIA BERTOLINI S.P.A., Turin (IT)

(*) Notice: Subject to any disclaimer, the term of this patent is extended or adjusted under 35 U.S.C. 154(b) by 284 days.

(21) Appl. No.: 15/628,201

(22) Filed: Jun. 20, 2017

(65) Prior Publication Data

US 2017/0361513 A1    Dec. 21, 2017

(30) Foreign Application Priority Data

Jun. 21, 2016    (IT) .................. 102016000064076

(51) Int. Cl.
   *C03C 17/00*        (2006.01)
   *B29C 45/00*        (2006.01)
   (Continued)

(52) U.S. Cl.
   CPC .... *B29C 45/0062* (2013.01); *B29C 45/14622* (2013.01); *C03C 17/004* (2013.01);
   (Continued)

(58) Field of Classification Search
   CPC .................................................. C03C 17/004
   (Continued)

(56) References Cited

U.S. PATENT DOCUMENTS 2,169,805 A * 8/1939 Kronquest ............... B05C 3/04
                                                       118/416
2,490,263 A * 12/1949 Gaiser .................... C03C 15/00
                                                       427/167
(Continued)

FOREIGN PATENT DOCUMENTS

CN    202844165 U  *  4/2013
EP       268029 A2  *  5/1988
(Continued)

OTHER PUBLICATIONS

Smith et al. Siliconization of Parenteral Drug Packaging Components. Parenteral Sci. Techniol (1988) Suppl 4S. S3-S13. (Year: 1998).*

(Continued)

*Primary Examiner* — Cachet I Proctor
(74) *Attorney, Agent, or Firm* — Dorsey & Whitney LLP

(57) ABSTRACT

Apparatuses and methods for on-line internal siliconing of glass bottles including a baking station for baking the siliconed bottles; wherein a siliconing station includes a support designed to selectively receive one bottle at a time, an injection device facing towards an inlet opening of the bottle, a mobile device for selectively blocking the injector against the inlet opening, a selective feeding device for feeding filtered compressed air and liquid silicone to the injector, the injector provided at the front, towards the support, with a drainage channel communicating with the inlet opening; an emitter to send towards a sensor and through the bottle on the support a beam of electromagnetic radiation; and a control unit to selectively inject into the bottle a mixture of silicone and compressed air and to process a signal emitted by the sensor to control the feeding device and/or a manipulator to discard defective bottles.

8 Claims, 3 Drawing Sheets

(51) Int. Cl.
  C03C 17/30 (2006.01)
  B29C 45/14 (2006.01)
  G01N 21/84 (2006.01)
  G01N 21/90 (2006.01)
  B29C 70/84 (2006.01)
  C10M 107/50 (2006.01)

(52) U.S. Cl.
  CPC ............ *C03C 17/30* (2013.01); *B29C 70/845* (2013.01); *C03C 2218/112* (2013.01); *C10M 107/50* (2013.01); *G01N 21/90* (2013.01); *G01N 2021/8427* (2013.01); *G01N 2021/8433* (2013.01)

(58) Field of Classification Search
  USPC .......................... 427/8, 9, 230, 236; 118/317
  See application file for complete search history.

(56) References Cited

U.S. PATENT DOCUMENTS

| | | | | |
|---|---|---|---|---|
| 3,379,306 | A * | 4/1968 | Sebring | B07C 5/128 209/527 |
| 5,324,357 | A * | 6/1994 | Okuno | B05C 5/0254 118/411 |
| 5,707,691 | A * | 1/1998 | Plester | B05D 3/207 427/235 |
| 5,723,189 | A * | 3/1998 | Sudo | B65D 1/0207 428/35.7 |
| 6,223,683 | B1 * | 5/2001 | Plester | B29B 17/0026 118/723 VE |
| 6,562,010 | B1 * | 5/2003 | Gyure | A61M 5/31513 427/2.3 |
| 6,806,459 | B1 * | 10/2004 | Ringlien | G01B 11/0691 209/524 |
| 2001/0041228 | A1 * | 11/2001 | Ronge | B08B 7/0042 427/554 |
| 2002/0012741 | A1 * | 1/2002 | Heinz | A61M 5/3129 427/2.1 |
| 2003/0159856 | A1 * | 8/2003 | Cochran | G01F 17/00 177/25.11 |
| 2003/0193346 | A1 * | 10/2003 | Jagiella | G01B 7/105 324/230 |
| 2004/0045356 | A1 * | 3/2004 | Dwyer-Joyce | F16C 19/52 73/579 |
| 2004/0104187 | A1 * | 6/2004 | McCain | A47B 73/002 211/75 |
| 2004/0199138 | A1 * | 10/2004 | McBay | A61J 1/00 604/403 |
| 2007/0082135 | A1 * | 4/2007 | Lee | B05D 1/002 427/346 |
| 2007/0229844 | A1 * | 10/2007 | Holz | G01B 11/0625 356/503 |
| 2012/0123345 | A1 * | 5/2012 | Felts | A61M 5/3129 604/187 |
| 2012/0217403 | A1 * | 8/2012 | Sartorius | G01N 21/3581 250/339.12 |
| 2013/0118947 | A1 * | 5/2013 | Gourde | A45D 34/02 206/524.3 |
| 2014/0305830 | A1 * | 10/2014 | Bicker | C03C 17/30 206/524.3 |
| 2016/0074894 | A1 * | 3/2016 | Gillest | B05B 13/0228 427/233 |

FOREIGN PATENT DOCUMENTS

| | | | | |
|---|---|---|---|---|
| EP | 2135523 | A1 | 12/2009 | |
| JP | 07149544 | A * | 6/1995 | ............ B05C 7/02 |
| WO | 03007868 | A1 | 1/2003 | |

OTHER PUBLICATIONS

CN202096452 translation. (Year: 2012).*
JP07149544 Translation (Year: 1995).*
Italian Search Report and Written Opinion dated Dec. 22, 2016 corresponding to Italian Application No. 102016000064076.

* cited by examiner

METHOD AND APPARATUS FOR THE ON-LINE INTERNAL SILICONING OF BOTTLES FOR PHARMACEUTICAL USE

PRIORITY CLAIM

This application claims priority from Italian Patent Application No. 102016000064076 filed on Jun. 21, 2016, the disclosure of which is incorporated herein, in its entirety, by this reference.

TECHNICAL FIELD

The present invention refers to a method and apparatus for internal siliconing, preferably on-line, of glass bottles for pharmaceutical use. The term "on line" here and below indicates that the siliconing operation is performed immediately downstream of a glass bottle production plant.

BACKGROUND

It is known that glass bottles and/or vials for pharmaceutical use are produced from a glass tube, which is cut and modeled into the desired shape by means of a flame and then undergoes annealing treatment. The glass used can contain compounds, such as metal oxides, which in use can partly pass in solution into the pharmaceutical product contained in the bottle. Furthermore, due to surface tension phenomenon, it can be difficult to accurately extract the pharmaceutical product contained in the bottle or in the vial, for example by means of a syringe, due to the shape assumed by the meniscus of the liquid pharmaceutical product contained in the bottle/vial.

To avoid these drawbacks, the glass bottles and vials for pharmaceutical use are internally siliconed, i.e. their inner surface is coated at the end of the production phases with a fine layer of liquid silicone, subsequently baked to guarantee perfect adhesion to the walls of the bottle.

It is nevertheless extremely difficult in the known art to obtain a silicone coating layer of the inner wall of the glass bottles or vials for pharmaceutical use which is uniform and without creating undesired accumulations of silicone in one or more points of the bottle/vial which accumulations, in addition to constituting a waste of raw material, can create problems during filling and visual inspection at the manual or automatic optical bench and/or during use of the bottles/vials.

SUMMARY

The object of the present invention is to provide a method and an apparatus for internal siliconing of glass bottles for pharmaceutical use, preferably immediately downstream of the production phase, which allow a fine silicone layer with uniform thickness to be obtained inside the bottles, thus avoiding exposed parts, point accumulations of silicone and waste of raw material.

Therefore, according to the invention, a method and an apparatus are provided to carry out the internal siliconing, preferably on-line, of glass bottles for pharmaceutical use having the characteristics illustrated in the attached claims.

BRIEF DESCRIPTION OF THE DRAWINGS

Further characteristics and advantages of the present invention will become clearer from the following description of a non-limiting embodiment thereof, with reference to the figures in the attached drawings, wherein.

DETAILED DESCRIPTION

With reference to FIGS. 1 to 5, reference number 1 indicates as a whole an apparatus for the production of glass bottles 2 for pharmaceutical use (FIG. 1) with internal siliconing, i.e. provided with an internal coating layer 3, with a predetermined thickness, of silicone or other non-adhesive material.

Figure 1:
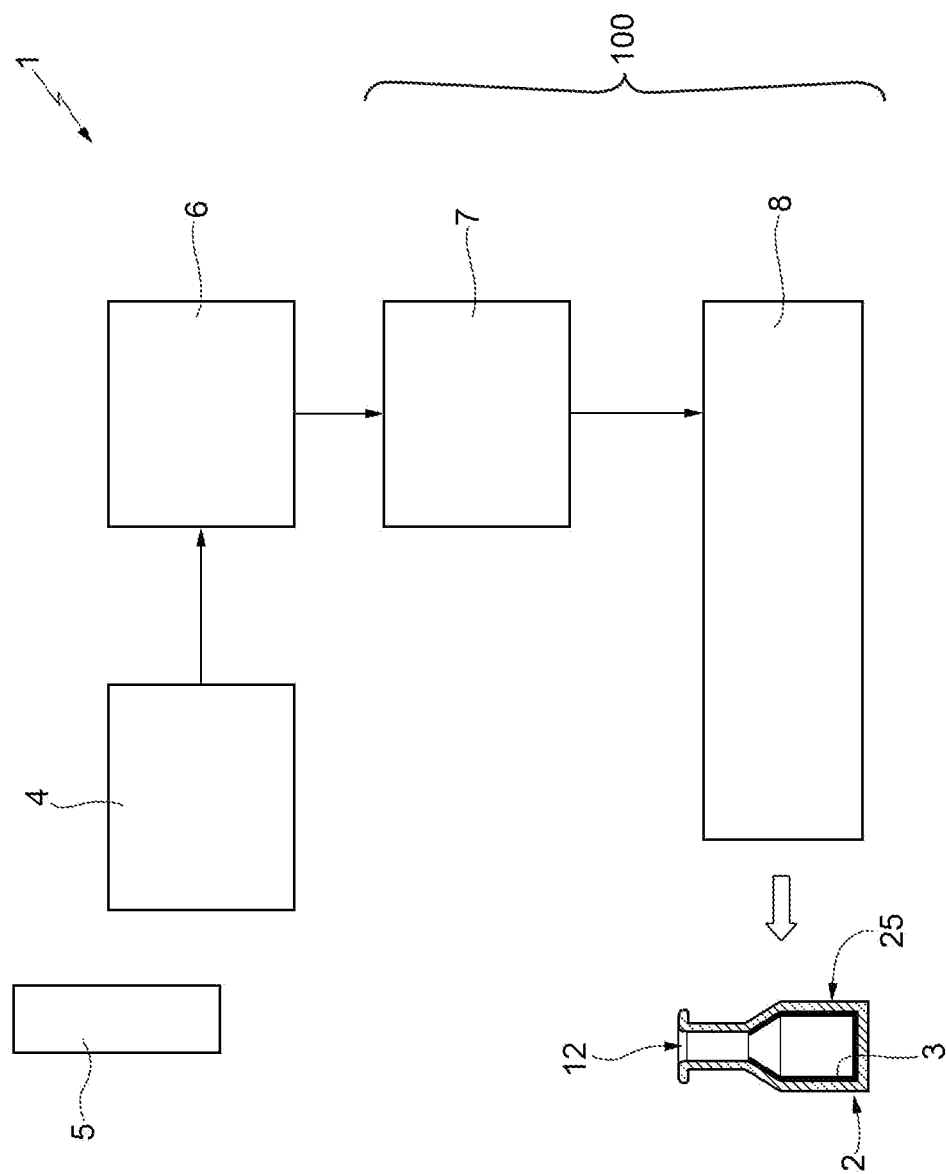
FIG. 1 illustrates schematically and by means of a block diagram a method and an apparatus for the production of glass bottles for pharmaceutical use with internal siliconing according to the invention.
Figure 4:
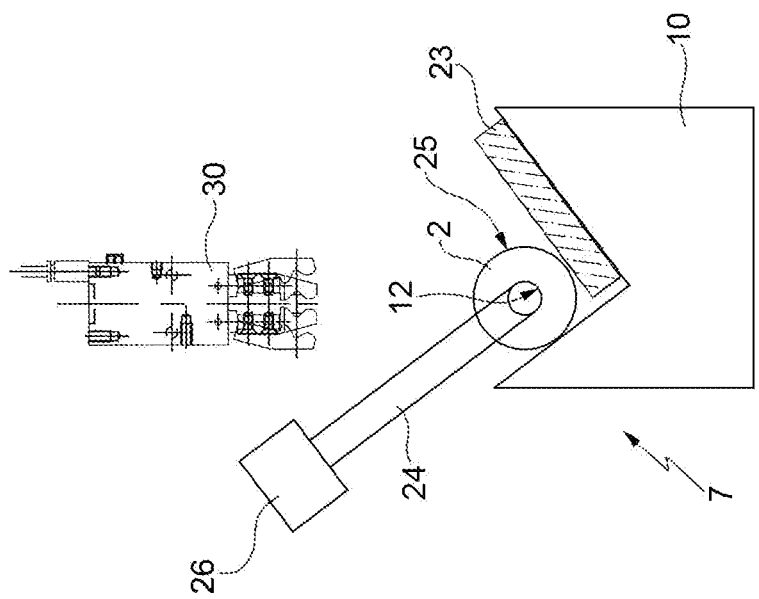
FIGS. 4 and 5 schematically illustrate two steps of the method according to the invention.
Figure 2:
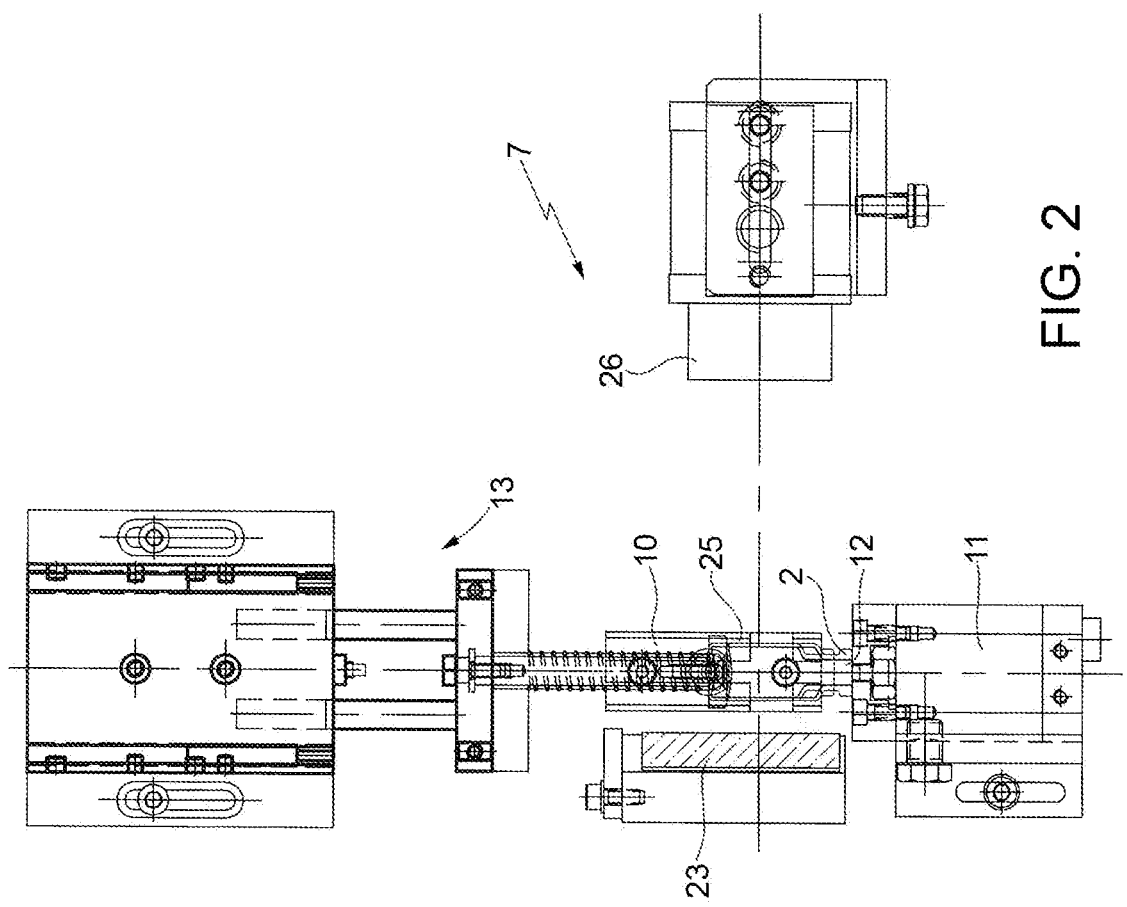
FIG. 2 illustrates an overhead plan view of a siliconing station of the apparatus of FIG. 1.
Figure 3:
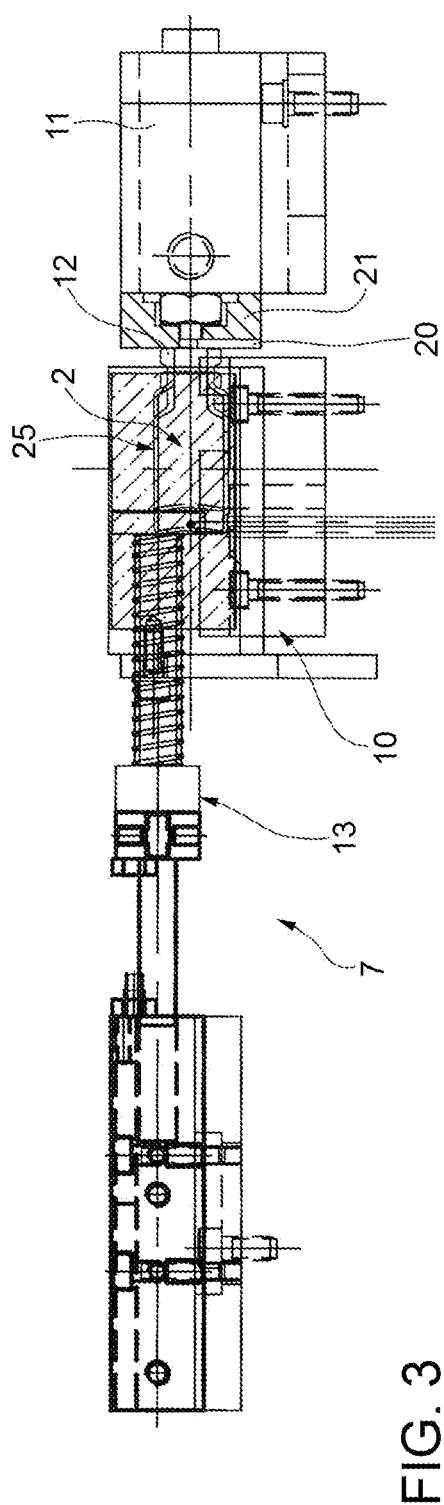
FIG. 3 illustrates an elevation side view of the siliconing station of FIG. 2.

The apparatus 1, which is illustrated only schematically in FIG. 1 by means of blocks, comprises a flame forming station (known and not illustrated in detail for the sake of simplicity) of the glass bottles 2 starting from a glass tube 5, an annealing station 6 consisting of an annealing oven, a siliconing station 7 and a baking station 8 for baking the siliconed glass bottles 2 and consisting of a tunnel oven, known and not illustrated in detail for the sake of simplicity, kept at a predetermined temperature, for example, ranging between 450° C. and 600° C.

According to one embodiment of the invention, the siliconing station 7 and baking station 8 form an apparatus 100 for on-line internal siliconing of the glass bottles 2, since they are arranged immediately downstream of the production stations 4 and 6 and form an integral part of the apparatus 1.

According to the schematic non-limiting illustrations in FIGS. 2-5, the siliconing station 7 comprises at least one support 10 designed to selectively receive one bottle 2 at a time oriented in a predetermined direction, preferably horizontal; the station 7 can comprise a plurality of supports 10, for example six, arranged side by side, of which only one is illustrated for the sake of simplicity. Each support 10 (FIG. 4) is V-shaped in a cross section relative to the above-mentioned predetermined direction, i.e. in the direction in which the cross section of the bottle 2 lies, so as to support the bottle 2 horizontally in a self-centering manner.

The station 7 further comprises at least one injection device 11 arranged according to the cited predetermined direction (in the example illustrated coinciding with an axis of symmetry of the bottle 2, which has a cylindrical symmetry), and so as to be facing towards an inlet opening 12 of each bottle 2 resting on the support 10.

According to one embodiment of the invention, the station 7 also comprises at least one mobile device 13 (FIGS. 2 and 3) to selectively block the injector 11, frontally, against the inlet opening 12 of a bottle 2 arranged on the support 10.

In the non-limiting example illustrated, the device 13 consists in a pneumatic plunger designed to push each bottle 2 resting on the V-shaped support 10 in a sliding manner against the injector 11, which is fixed; obviously, according to a possible variation not illustrated, the mobile device could consist of a system of sliding of the injector 11 towards the support 10 and a relative bottle 2 carried by the support 10 and which is kept in a fixed position.

According to the invention, the siliconing station 7 further comprises a feeding device 15 (illustrated only schematically and only in FIG. 5) for selectively feeding to at least one injector 11 a flow 16 of super-filtered compressed air in order to guarantee the absence of contaminants (oil/condensate) and a flow 17 of liquid silicone appropriately diluted in water.

The device 15 consists for example of a compressed air feed pipe 18, a feed pipe 19 for liquid silicone (or other compound to be deposited inside the bottle 2, if necessary with the addition of a volatile solvent) and solenoid valves (or pneumatic valves) 20 for the pipe 18, and 21 for the pipe 19. Furthermore, the pipe 19 is arranged as a branch of the pipe 18, downstream of the valve 20 with respect to the flow of compressed air 16 indicated by the arrow in FIG. 5.

In this way, the feed device 15 is designed to selectively introduce into the injector 11 and then, via the latter, into a bottle 2 present on a support 10, through the inlet opening 12 of the bottle 2, either a mixture of liquid silicone and compressed air, or compressed air only, depending on whether both the valves 20 and 21 or only the valve 20 is/are open.

Furthermore, the valves 20 and 21 are sized so that, by means of the branch introduction of the pipe 19 into the pipe 18 and/or in any case by means of appropriate internal devices of the injector 11, of a type obvious to a person skilled in the art and therefore not illustrated in detail for the sake of simplicity, the liquid silicone is present in the air/silicone mixture which forms when both the valves 20,21 are open, in a quantity slightly in excess with respect to a predetermined quantity to be introduced into the bottle 2 and which is calculated at the design stage; here and below, by "slightly in excess" it is meant a quantity higher by no more than 10% by weight with respect to the predetermined quantity calculated at the design stage.

According to a non-secondary aspect of the invention, the injector 11 is provided at the front, towards the support 10, with a drainage channel 20 (FIGS. 3 and 5) to allow, as will be seen, the excess of silicone 17 and the compressed air 16 to flow out of the bottle 2 through the inlet opening 12 after being introduced into the bottle 2 through said inlet opening 12 by means of the injector 11.

The drainage channel 20 is designed to be in communication with the inlet opening 12 of the bottle 2 when the injector 11 is blocked against the inlet opening 12 of the bottle 2 and, in the example illustrated, the drainage channel 20 consists of a simple front groove obtained on the injector 11 below an axis of symmetry X of the injector 11 coinciding with the axis of symmetry of the bottle 2 resting on the support 10; the groove 20 is therefore obtained only at a lower front portion 21 of the injector 11.

Figure 5:
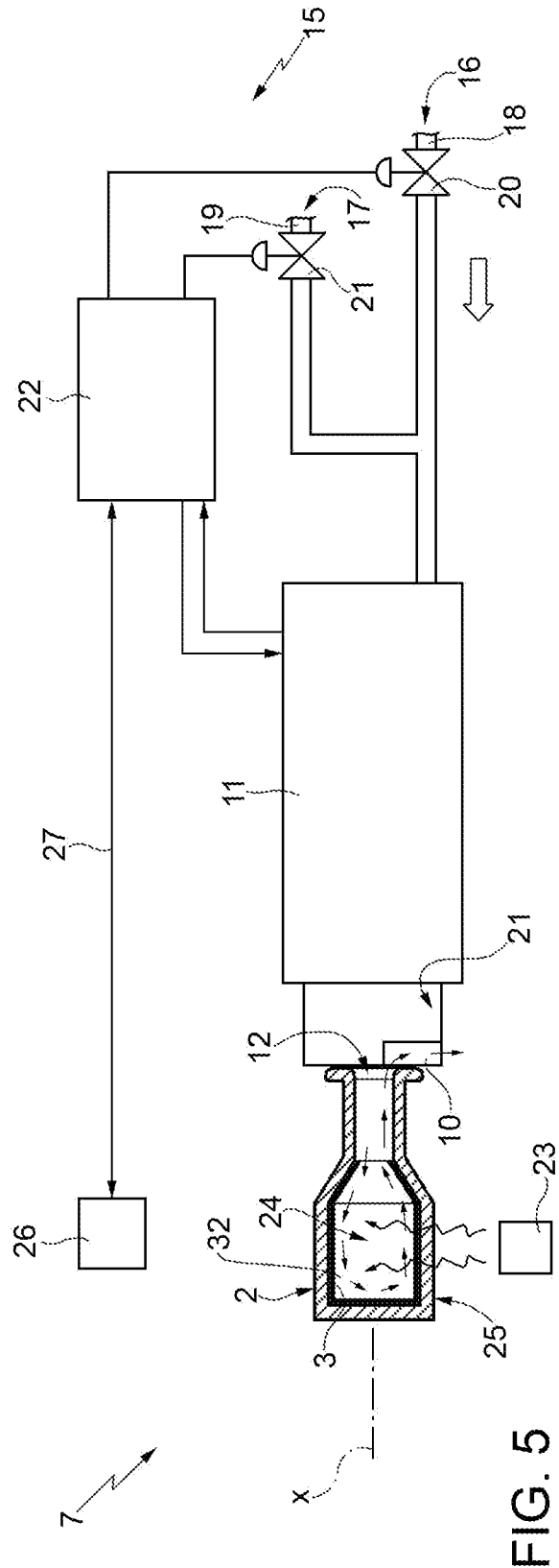

According to a further non-secondary aspect of the invention, the siliconing station 7 further comprises an electronic control unit 22 (FIG. 5), an emitter 23 designed to emit a beam 24 of electromagnetic radiation, for example visible light or IR or UV, through a side surface 25 of the bottle 2, transversely to the cited predetermined direction which, in FIG. 5, coincides with the axis X, and a sensor 26 designed to receive the beam of radiations 24 after the latter have crossed the bottle 2 and emit a consequent electrical signal, for example towards the control unit 22, through a data line 27 (FIG. 5).

The emitter 23 is arranged beside the support 10, throughout the length of the same or at least throughout the length of a bottle 2, while the sensor 26 is arranged laterally to the support 10 on the opposite side to the emitter 23 and is designed, as already mentioned, to receive the beam 24 of electromagnetic radiations and consequently generate an electrical signal proportional to the intensity of the beam 24 of electromagnetic radiations received after crossing the bottle 2 and, therefore, as a function of the absorbance of the side wall 25.

The control unit 22 is designed, in the example illustrated, to process the electrical signal emitted by the sensor 26 as a function of parameters previously stored therein and to consequently perform a series of operations.

According to a first embodiment, the electronic control unit is designed/programmed to control, as a function of the processing, the selective feed device 15 of liquid silicone and air to the injector 11, for example by controlling opening/closing of the valves 20,21. According to another possible embodiment, the electronic control unit 22 is designed/programmed to control, as a function of the processing, a manipulator 30 (FIG. 4) to discard any defective bottles 2 present on the support 10, while the valves 20,21 are controlled, for example, always through the control unit 22, according to pre-programmed cycles with fixed duration and flow rate of the air flows 16 and liquid silicone 17. According to a further possible embodiment, the control unit 22 is designed/programmed to control, as a function of the processing, both the valves 20,21, and the manipulator 30.

On the basis of what has been described so far, it is clear that the invention further relates to a method for carrying out on-line internal siliconing of glass bottles 2 for pharmaceutical use comprising, immediately downstream of a step of forming the bottle 2 by means of the stations 4 and 6, a step of internal siliconing of the bottle 2, by means of the station 7, carried out when the bottles 2, once removed from the oven 7, are still hot.

According to the invention, the siliconing phase comprises the steps of:

a)—arranging a bottle 2 on a support 10 which maintains the bottle 2 oriented in a predetermined direction, in the example illustrated the direction of the axis X;

b)—contacting an inlet opening 12 of the bottle 2 arranged according to the predetermined direction X with an injection device 11;

c)—introducing into the bottle 2, by means of the injection device 11 and through the inlet opening 12 (FIG. 5), a mixture 32 of liquid silicone and compressed air (indicated by the arrows in FIG. 5) in which the liquid silicone 17 is present in a slight excess with respect to a predetermined quantity to be introduced into the bottle 2, providing a drainage path out of the bottle 2 and through the same inlet opening 12 for the excess of silicone 17 and for the compressed air 16, said drainage path being defined in the example illustrated by the drainage channel or groove 20;

d)—subsequently introducing into the bottle 2, by means of the injection device 11 and through the inlet opening 12, a flow of compressed air 16 only, to completely remove the excess of silicone 17 through the drainage path 20 by means of the flow 16 of compressed air only.

Steps c) and d) are obviously controlled by the control unit 22.

As already said, according to the method of the invention the support 10 has a V-shaped cross section, so as to support the bottle 2 horizontally in a self-centering manner.

The siliconing phase further comprises the step of controlling the quantity of silicone present in a layer 3 of silicone deposited inside the bottle 2 and against an inner surface of the side wall 25 of the bottle 2 by passing a beam of electromagnetic radiation 24, for example visible light, through the bottle 2, transversely to the predetermined direction X, generating the beam 24 of electromagnetic radiation by means of the emitter 23 arranged beside the support 10 and receiving the beam 24 of radiation by means of a sensor 26 arranged laterally to the bottle 2, on the opposite side to the emitter 23.

The side wall 25 of the bottle 2 is cylindrical and the sensor 26 and the emitter 23 are arranged in front of each other (FIG. 5) and with the bottle 2 in the middle so that the beam 24 of electromagnetic radiation transversally crosses the bottle 2 according to a diametrical direction which is oblique relative to the horizontal.

The step of controlling the quantity of silicone present in the layer 3 of silicone deposited inside the bottle 2 and against an inner surface of the side wall of the bottle is carried out continuously or discontinuously for the entire duration of the step of introducing into the bottle 2 the mixture of liquid silicone 17 and compressed air 16 and/or for the entire duration of the step of introducing the flow 16 of compressed air only; the latter step is interrupted when an electrical signal emitted by the sensor 26 indicates to the control unit 22 that the quantity of silicone present in the layer 3 of silicone deposited inside the bottle 2 and against the inner surface of the side wall 25 of the bottle 2 has reached a desired predetermined value.

According to a possible variation of the method of the invention, the step of controlling the quantity of silicone present in the layer 3 of silicone deposited inside the bottle (substantially proportional to the thickness of said layer of silicone 3 deposited inside the bottle 2 and against an inner surface of the side wall 25 of the bottle 2) is carried out continuously or discontinuously for the entire duration of the step of introducing into the bottle 2 the mixture of liquid silicone 17 and compressed air 16 and/or for the entire duration of the step of introducing the flow 16 of compressed air only; but the electrical signal emitted by the sensor 26 is processed by the control unit 22 in graphic form checking that the same remains within two predetermined threshold values defining a minimum and a maximum acceptable quantity of silicone in the layer 3 of silicone; the control unit 22 decides to discard a siliconed glass bottle 2, for example by means of the manipulator 30, if the signal emitted by the sensor 26 exceeds one or both the threshold values, signaling that the bottle 2 present on the support 10 is defective, in the sense that the thickness of the layer 3 of silicone deposited does not comply with the design specifications, since it is too thin or too thick.

Lastly, the method of the invention also comprises a step of baking of the layer 3 of silicone deposited during the siliconing step, feeding the siliconed glass bottles into the tunnel oven 8 kept at a predetermined temperature.

Preferably, in particular in the case of larger bottles 2, the siliconing step also comprises a second step of introducing into the bottle 2, by means of the injection device 11 and through the inlet opening 12, a flow 16 of compressed air only; said second step of introducing compressed air only is carried out before the step of introducing into the bottle 2, by means of the injection device 11 and through the inlet opening 12, the mixture of liquid silicone and compressed air in which the liquid silicone is present in excess, so as, for example, to clean the inside of the bottle 2.

The flow 16 of compressed air can be heated.

Furthermore, the V shape of the support 10 means that it can accommodate bottles 2 of different sizes, which can therefore all be treated by the same station 7.

By means of the method described it is possible to dose with extreme precision and simply and inexpensively the thickness of the layer 3 of silicone which is deposited in the bottle 2, even if the thickness of the layer 3 is very fine. The excess silicone flows out of the bottle 2 and can be recovered. Lastly, uniformity of the layer 3 of silicone is also ensured. For said purpose, according to a possible variation not illustrated, the bottle 2 can be rotated on the support 10 around the axis X, so as to expose all the areas of the side wall 25 to the beam 24 of electromagnetic radiation. Alternatively, while the bottle 2 is at a standstill, the emitter 23 and the sensor 26 associated with it can be rotated around the axis X.

Obviously, in the case of several supports 10, also the other components of the station 7 such as the injector 11, the emitter 23 and the sensor 26 are multiplied.

All the objects of the invention are therefore achieved.

The invention claimed is:

1. A method for carrying out siliconing of glass bottles for pharmaceutical use, the method comprising:
   internal siliconing of the bottle, wherein the internal siliconing includes:
      arranging a bottle on a support that maintains the bottle oriented in a predetermined direction;
      contacting an inlet opening of the bottle arranged according to the predetermined direction with an injection device;
      selectively blocking the bottle and the injection device frontally against each other, with the injection device arranged against the opening of the bottle arranged on the support;
      introducing into the bottle, by the injection device and through the inlet opening, a mixture of liquid silicone and compressed air in which the liquid silicone is present in excess with respect to a predetermined amount to be introduced into the bottle;
      providing a drainage path for the excess silicone and for the compressed air out of the bottle and through the inlet opening, the drainage path being provided by a drainage channel arranged at the front of the injection device, towards the support, the drainage channel being designed to be in communication with the inlet opening of the bottle when the injection device is blocked against the inlet opening of the bottle; and
      introducing into the bottle, by the same injection device and through the inlet opening, a flow of only compressed air to completely remove the excess silicone through the drainage path by the flow of compressed air.

2. The method according to claim 1, wherein the support has a V-shaped cross-section, so as to support the bottle horizontally in a self-centring manner.

3. The method according to claim 1, wherein the siliconing includes controlling a quantity of silicone present in a layer of silicone deposited inside the bottle and against an inner surface of a side wall of the bottle by passing a beam of electromagnetic radiation through the bottle transversely to the predetermined direction, the beam of electromagnetic radiation generated by an emitter arranged beside the support and received by a sensor arranged laterally to the bottle, on an opposite side to the emitter; and
   said controlling includes determining the thickness of silicone deposited inside the bottle as a function of the absorbance of the side wall.

4. The method according to claim 3, wherein the side wall of the bottle is cylindrical, and wherein the sensor and the emitter are arranged in front of each other and with the bottle in the middle so that the beam of electromagnetic radiation passes through the bottle transversely according to a diametrical direction oblique relative to the horizontal.

5. The method according to claim 3, wherein controlling a quantity of silicone present in the layer of silicone deposited inside the bottle and against an inner surface of the side wall of the bottle is carried out continuously or discontinuously for the whole of the duration of the act of introducing into the bottle the mixture of liquid silicone and compressed air and/or for the whole of the duration of the act of introducing the flow of only compressed air; this latter act being interrupted when an electrical signal emitted by the sensor indicates that a thickness of the layer of silicone deposited inside the bottle and against the inner surface of the side wall of the bottle has reached a desired predetermined value.

6. The method according to claim 3, wherein the controlling a quantity of silicone present in the layer of silicone deposited inside the bottle and against an inner surface of the side wall of the bottle is carried out continuously or discontinuously for the whole of the duration of the act of introducing into the bottle the mixture of liquid silicone and compressed air and/or for the whole of the duration of the act of introducing the flow of only compressed air; an electrical signal emitted by the sensor processed in graphic form checking that the same remains within two predetermined threshold values defining a minimum and a maximum acceptable quantity of the silicone in the layer of silicone; a siliconized glass bottle being discarded if the signal emitted by the sensor exceeds one or both threshold values.

7. The method according to claim 1, further comprising baking the layer of silicone deposited during the act of siliconing by feeding the siliconized glass bottles into a tunnel oven maintained at a predetermined temperature.

8. The method according to claim 1, wherein the siliconing includes a second act of introducing into the bottle, by the same injection device and through the opening, a flow of only compressed air, the second act of introducing only compressed air being carried out before the act of introducing into the bottle, by the injection device and through the opening, the mixture of liquid silicone and compressed air in which the liquid silicone is present in excess.

\* \* \* \* \*